Figure 1:
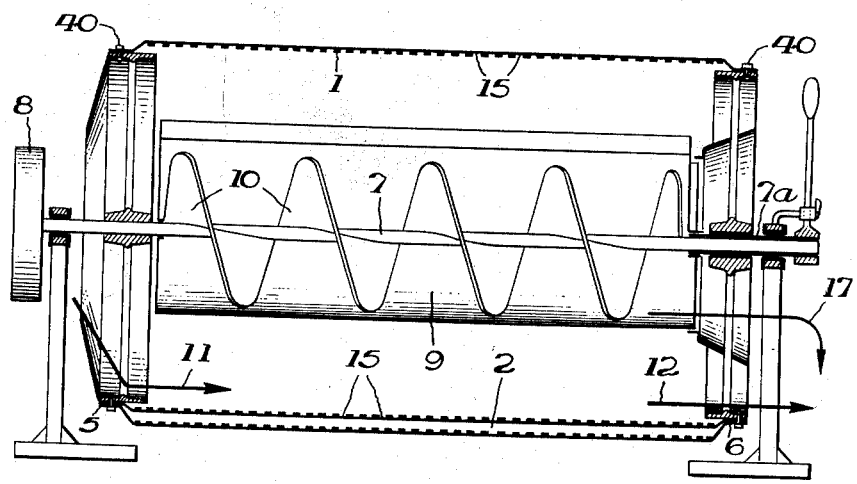

Feb. 16, 1954    J. MUSIL    2,669,353
APPARATUS FOR THE SELECTION OF SEEDS OR SIMILAR MATERIAL
Filed Feb. 8, 1950    2 Sheets-Sheet 1

INVENTOR
Josef Musil
BY Henry W. Bock
AGENT

Feb. 16, 1954  J. MUSIL  2,669,353
APPARATUS FOR THE SELECTION OF SEEDS OR SIMILAR MATERIAL
Filed Feb. 8, 1950  2 Sheets-Sheet 2

INVENTOR
Josef Musil
BY Henry W. Bock
AGENT

Patented Feb. 16, 1954

2,669,353

UNITED STATES PATENT OFFICE 2,669,353

APPARATUS FOR THE SELECTION OF SEEDS OR SIMILAR MATERIAL

Josef Musil, Vienna, Austria, assignor to Maschinenfabrik Heid Aktiengesellschaft, Vienna, Austria, a joint-stock company Application February 8, 1950, Serial No. 142,961

Claims priority, application Austria February 11, 1949

11 Claims. (Cl. 209—95)

The invention relates to apparatus for the selection of seeds or similar material, especially to so-called trieurs for the separation of long-sized and short-sized seed-grains and for the purification of the latter from broken grains and from weed-seeds, said trieurs having a rotating unperforated cylinder with pocket shaped selecting cells, and a collecting trough arranged on the inside of the cylinder. The mode of operation of said trieurs is in many regards unsatisfactory. Thus, because of the low speed at which the material is passed through the cylinder and through the collecting trough, the emptying procedure of the cylinder continues, after the supply of material has been shut off, only very slowly, and, moreover whether all the material has been discharged cannot be checked. Furthermore, the cleaning of the selecting cells may be carried out in a very complicated and incomplete manner only, involving a considerable loss of time, since the cylinder must for that purpose be demounted. The present invention aims at avoiding these drawbacks and, in addition, to bring about further advantages.

The invention essentially consists in that with an apparatus for the selection of seeds or similar material having an unperforated cylinder provided with selecting cells, a collecting trough being placed in said cylinder, one or several apertures or slits are provided in the wall of the cylinder, which apertures or slits may be closed and opened.

This construction may be effected in such a manner that the closing and opening of the apertures or slits is automatically brought about by the material. For this purpose the apertures are provided with roof-like parts, and opening in one circumferential direction of the cylinder, the apertures suitably extending over the entire length of the cylinder. With this embodiment the material fills the apertures in the part of the wall of the cylinder ascending during the rotation, an angle of slope being thus formed, whereby said apertures are closed. During a rotation of the cylinder in the circumferential direction, in which the roofed apertures are opening, the selection of the material is thus effected; the material placed in the cylinder will not flow out through the apertures, either at the standstill, or during the rotation of the cylinder, this being prevented by the roofs of the apertures. If the cylinder is rotated in the direction opposite to the selecting direction, i. e. turned back, the material no longer blocks the apertures, but discharges through them freely. Thus emptying the cylinder may be brought about in simple manner and instantly by turning back the cylinder over a short passage, whereby the material is immediately discharged through the apertures. The contents of the trough may be in similar manner rapidly emptied by tilting the trough, so that its contents fall into the empty cylinder.

The apertures in the wall of the cylinder may be formed by overlapping parts of the wall of the cylinder, and preferably said parts of the wall are throughout the whole inside surface provided with selecting cells. Moreover, said parts of the wall of the cylinder are suitably dismountable, whereby the emptying procedure may be checked and the cleaning of the selecting cells practically enabled, and, moreover, resulting in a simplification and an improvement in the production of said trieurs, since the individual parts of the wall may be treated in an easier and hardened in a better way than a cylinder made out of one part.

The removable arrangement of the walls of the cylinder is also advantageous for enabling in a short time and without dismounting the trieur the change of said parts for parts with cells of other dimensions, if it is intended purifying other material in said trieur.

The overlapping parts of the wall of the cylinder may be arranged so as to be inclined towards the outside, thus deviating from the circular circumferential direction. This inclination, or eccentric arrangement of the parts of the wall of the cylinder, makes it possible to influence the moment when the grains leave the cells, and to even bring about a modification, e. g. reduction, of the number of revolutions, which may be necessary in connection with some kinds of seeds, without necessarily providing a special shape of the cells. The cells have diverging flanks, so that, with walls of a cylindrical shape, the speed must not fall below a certain minimum speed, in order to prevent the grains from falling prematurely out of the cells in the upper part of the cylinder. By the inclined position of the parts of the wall their cells are likewise in sloping direction, so that the position of the discharge zone for the seed-grains lifted by the selecting cells, as well as the number of revolutions of the cylinder may be varied.

According to a further development of this embodiment the longitudinal parts forming the wall of the cylinder are, according to the invention, adjustable for altering their inclined position. This construction has the advantage that the position of the discharge zone and the number of revolutions of the trieurs may now be altered, which could hitherto within wider limits not have been done. With a more inclined position the grains placed in the cells are thrown out only when they have arrived at the vertex point or behind the same, while with a slighter inclination said grains fall out of the selecting cells at an earlier time. Through influencing the position of the discharge zone by means of an adjustment of the parts of the wall of the cylinder there is given the possibility of reducing the number of revolutions of the seed selecting machine, and yet transferring the discharge zone e. g. as far as the vertex point of the cylinder.

If the roofed apertures in the wall of the cylinder are disposed with, the advantage of the inclined position of the longitudinal parts is considered sufficient, the parts of the wall of the cylinder may be connected by webs, which may be dismountable or linked to said parts.

The closing and opening of the apertures or slits in the wall of the trieur may likewise be effected by cover sheets or the like, which are either removably connected with the wall or linked to the same. In this case the apertures need no more be provided with roof-like parts. This embodiment has above all the advantage that the material may be rapidly emptied even from the hitherto customary closed trieurs, and that there is not required, as had hitherto been the case, the waiting during a comparatively long period, until the material has passed the whole cylinder, in order to be discharged at the end of the same. It suffices on the contrary, taking off or tilting open the cover plate and further rotating the cylinder in the same direction as before for selecting, whereby the discharge aperture comes to lie at the lowest spot, so that the material may flow out. The wall of the cylinder may be constructed in one part or in several parts. With a construction comprising two or several parts the closable apertures may be provided in one or several of the longitudinal parts of the wall constituting the cylinder, or likewise even one of the parts of the wall may constitute the cover. According to the invention at least one of the longitudinal parts of the wall is then linked with the next one. If the cylinder comprises several parts of the wall removably connected with one another, there may, in consequence of the smaller dimensions of said parts, the discharge aperture likewise be constituted by demounting one of those parts. The construction of the cylinder comprising several parts also facilitates, especially in comparison with the one-part construction, its demounting, since the individual parts of the cylinder may be more easily removed because of their smaller dimensions, without necessitating a demounting of the trieur, also with regard to the change of the parts with other cells.

Figure 2:
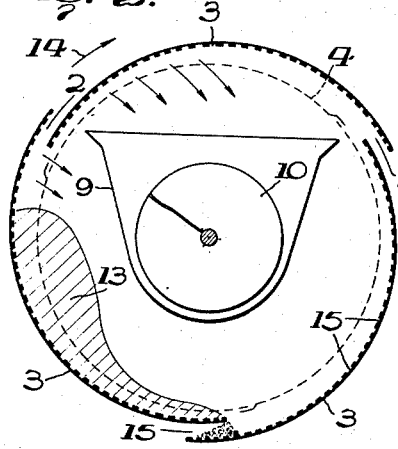
Figure 5:
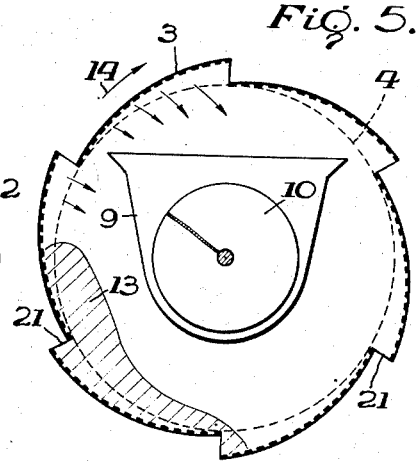
Figure 3:
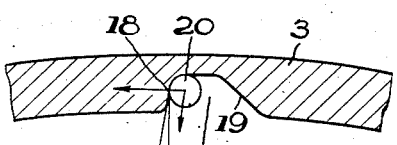
Figure 4:
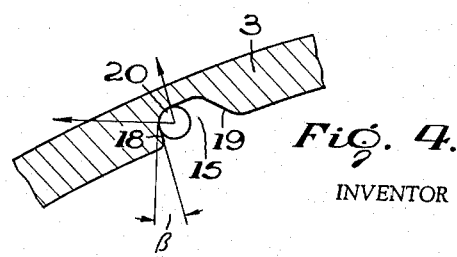
Figure 6:
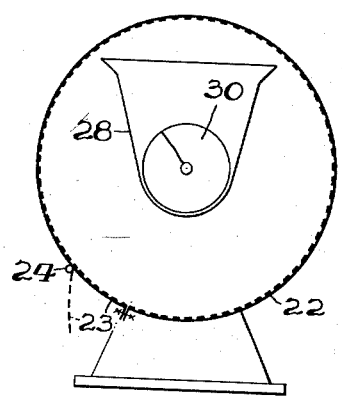
Figure 7:
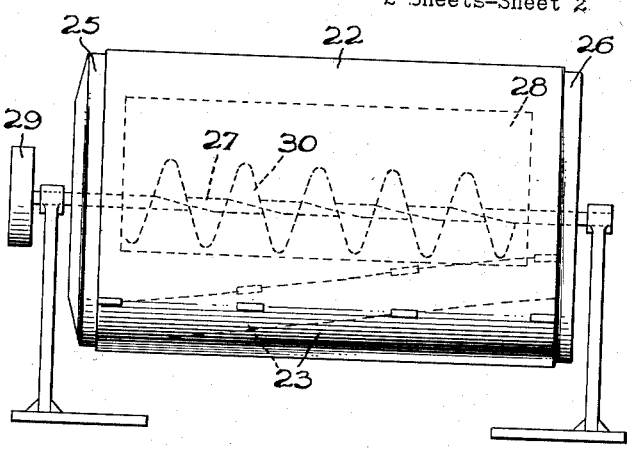
Figure 8:
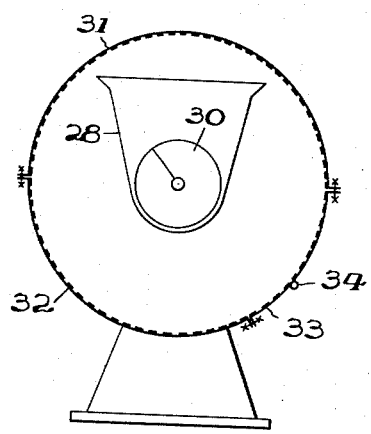
Figure 9:
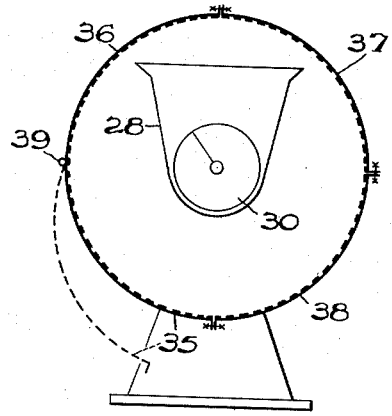
Figure 10:
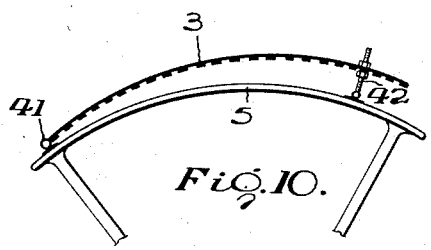
Figure 11:
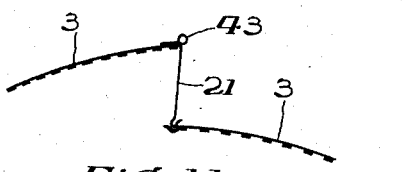

Embodiments according to the invention are schematically shown, by way of example, in the accompanying drawings, in which Fig. 1 shows a trieur in longitudinal section, Fig. 2 a cross section to Fig. 1, Fig. 3 a detail to the illustration of the position of the cells with a wall of a circular cylindric shape, Fig. 4 the same detail as Fig. 3, however, with a wall in inclined position, Fig. 5 a modified embodiment of a trieur in cross section, Fig. 6 a cross section of a one-part cylinder with a covered discharge aperture, Fig. 7 a side view to Fig. 6, Figs. 8 and 9 cross sections of two further modified embodiments, and Figs. 10 and 11 details to the embodiment shown in Figs. 2 and 5, respectively.

Like reference characters denote like parts in the several figures of the drawings.

According to Figs. 1 and 2 roofed apertures in the shape of the longitudinal slits 2 are provided in the casing of the cylinder 1 of the trieur, said apertures opening in one circumferential direction of the cylinder, and being constituted by the cylinder comprising several bent parts or arcuate members 3 of the wall, which circumferentially overlap one another. The parts or arcuate members 3 of the wall are thereby each eccentrically arranged relative to the axis of the cylinder and are inclined towards the outside, thus deviating from the circular circumference. The casing of the cylinder of the trieur may naturally likewise show in customary manner a circular cross section (circular line 4), forming thereby roofed apertures. The parts 3 of the wall are at their front ends, suitably dismountably connected by screws 40 with ring or annular members 5, 6 supported upon the drive shaft 7 by spokes, whereby the member 6 arranged at the discharge end of the cylinder is running idle upon the fixed sleeve 7a carrying the collecting trough 9, the other member 5 provided on the entering side being rigidly connected with the drive shaft 7. The drive of the shaft is brought about through the pulley 8.

In the cylinder there is placed the collecting trough 9 together with the worm conveyor 10. The material is filled into the cylinder in the direction of the arrow 11, and passing through said cylinder under the pressure of the subsequently filled up material in axial direction until leaving the cylinder (arrow 12), thereby rolling off in the cylinder in the shape of the kidney 13 (Fig. 2) in the direction of rotation indicated by the arrow 14, without leaving through the slits 2. The grains lifted in the selecting cells 15 are falling into the collecting trough 9, wherefrom they are axially carried off by the worm conveyor 10 (arrow 17, Fig. 1). The selecting cells 15 are likewise provided in the roofed parts of the wall of the cylinder, and covered by the material to be selected in consequence of the natural angle of slope of said cylinder.

For emptying purposes the cylinder is turned back against the direction of rotation of the arrow 14, the material remaining in the cylinder being instantly discharged through the slits 2. By tilting the trough 9 the material placed therein may likewise be in this manner rapidly removed.

The inclination of the parts 3 of the wall to the circular line 4 may be adjustable in various ways, for instance the parts 3 may be connected by pivotal joints 41 with the members 5, 6, said parts being adjustable by screws 42, as shown in Fig. 10. By this inclination, or the eccentric position of each of the parts 3 relative to the axis of the cylinder, the cells are likewise obliquely directed upwards, as may be seen in Figs. 3 and 4, wherein one cell 15 is shown in a wall of the cylinder according to the circular line 4 (Fig. 3), and in an eccentrically adjusted wall 3 (Fig. 4). The pressed cell 15 shows diverging flanks 18, 19, whereby the grains 20 are contacting the rear flank 18 inclined at the angle $\alpha$ to the vertical line, said flank thus enabling the grain to be freely discharged downwardly from the cells in the upper part of the cylinder. With an inclined wall 3 the flank 18 comes to lie on the other side of the vertical line at the angle $\beta$, so that said flank somewhat supports the grain 20 from below, and thus, according to the inclination which likewise causes a change of the width of the slits 2, the falling out of the grains from the cells may be regulated at an earlier or later moment in the upper part of the cylinder, i. e. the position of the discharge zone for the grains lifted up by the selecting cells may be varied, and in connection therewith also the number of revolutions may be varied, e. g. reduced in comparison to the number usual with the customary cylindric trieurs. The inclination makes it possible, with an unchanged size of the perforation, separating the seeds to be selected into spherically and prismatically shaped seeds.

With the embodiment by way of example according to Fig. 5 the cylinder of the trieur is constituted by six obliquely inclined parts 3 of the wall, which are, by means of the webs or walls 21, passing over into one another step-like, so that the parts 3 are constituting a complete wall without slits. For emptying purposes one or several webs may be dismountable or tiltable about a joint 43, as shown in Fig. 11, or a part 3 of the wall may be demounted. For the rest, this embodiment and its manner of operation are similar to those formerly described.

According to Figs. 6 and 7 a longitudinal slit is provided in the wall 22 of the cylinder, said slit being covered by a cover sheet 23. The cover sheet may be removably connected with the wall 22 by means of screws, clamps or the like, or linked by means of a joint 24 so that said sheet may be tilted open. The wall of the cylinder is, similar to the embodiment according to Figs. 1 and 2, dismountably connected at the front ends with the spoke discs 25, 26 which are supported upon the drive shaft 27, the disc 26 arranged at the discharge end of the cylinder running idle upon a stationary sleeve carrying the collecting trough 28, the other disc 25 provided on the entering side being rigidly connected with the drive shaft 27. The drive of the shaft 27 is brought about by means of the pulley 29. In the cylinder is placed the stationary collecting trough 28 with the worm conveyor 30.

The construction according to Fig. 8 is similar to that according to Fig. 6, only the cylinder comprises two semi-circularly bent parts 31, 32 of the wall, a lid-like part 33 being linked by the joint 34 to the part 32. This arrangement may naturally also be provided with a wall of the cylinder comprising more than two parts. With the modified embodiment according to Fig. 9 the wall of the cylinder comprises e. g. four parts 35, 36, 37, 38, in which case the cover sheet is omitted and the part 35 of the wall is linked about the joint 39, as is illustrated in Fig. 9 by dotted lines.

The parts of the wall constituting the cylinder may likewise differ as to their size. The apertures released by the parts of the wall or by the cover sheets may extend over the whole length of the cylinder or likewise only over one part of the same. Said apertures may also obliquely pass along the circumference of the cylinder (as illustrated in Fig. 7 by dotted lines). By opening said parts the discharge aperture is released over the whole length of the cylinder or over an essential part of said length, so that the emptying of the cylinder may be rapidly brought about by turning it back. Thus the invention is not limited to a special cross section of the cylinder, which may be e. g. made polygonal with flat sheets.

While the invention has been shown in the particular embodiments described it is not limited thereto, as modifications thereof may be made without departing from the scope of the appended claims.

I claim:

1. In an apparatus for the selection of seeds or similar materials the combination comprising frame means, a drum rotatably mounted in the frame means and receiving the material at one end and discharging a part of the material at the opposite end, the drum having on its interior surface material selecting cells and being constituted by peripheral arcuate wall means having at least a pair of circumferentially overlapping and radially spaced edges defining an aperture opening from the interior of the cylinder to the exterior thereof, whereby rotation of the drum in one or the selecting direction will cause the aperture to be filled with material without discharging same through the aperture to the exterior, a collecting trough having an open top and supported within the drum, and receiving material discharged from the cells, and means mounted within the trough and discharging material from the trough exteriorly of the drum.

2. The apparatus according to claim 1 and wherein the trough is pivotally supported within the drum for complete inversion.

3. The apparatus according to claim 1 and wherein the aperture extends axially of the drum.

4. The apparatus according to claim 1 and wherein the aperture extends obliquely to the drum axis.

5. The apparatus according to claim 1 and also comprising operable means closing the aperture.

6. In an apparatus for the selection of seeds or similar materials the combination comprising frame means, a substantially horizontally disposed drum rotatably mounted in the frame means and receiving material at one end and discharging a part of the material at the opposite end, the drum including at least two imperforate longitudinally extending peripheral arcuate wall members each having material cells on its inner surface material selecting cells, the members having adjacent circumferentially overlapping radially spaced edges defining at least an aperture extending throughout the length of the drum and opening from the interior of the cylinder to the exterior thereof, and during rotation of the drum in one or the selecting direction being filled with material without discharging same through the aperture, a collecting trough open at the top mounted within the drum and receiving material from the cells, and means discharging material from the trough exteriorly of the drum.

7. The apparatus according to claim 6 and also comprising operable means adjusting the spacing of the overlapping wall edge portions whereby the selection of the material may be varied.

8. The apparatus according to claim 6 and wherein the drum includes end members and each of the longitudinally extending wall members is pivotally connected at one of its longitudinal edges to the end members and the other longitudinal edge of each wall member is in circumferentially overlapping and radially spaced relation to one of the longitudinal edges of an adjacent wall member, and also comprising means each carried by an end member and connected to a wall member and operable to adjusting the spacing of the overlapping members whereby the selection of material may be varied.

9. The apparatus according to claim 6 and wherein the wall members are arcuate.

10. The apparatus according to claim 6 and wherein the wall members are arcuate and eccentrically arranged with respect to the drum axis.

11. The apparatus according to claim 6 and wherein at least one of the wall members is removably connected to the remaining parts of the drum.

JOSEF MUSIL.

References Cited in the file of this patent

UNITED STATES PATENTS

| Number | Name | Date |
|---|---|---|
| 112,087 | Sternberg | Feb. 21, 1871 |
| 917,339 | Mobus | Apr. 6, 1909 |
| 1,987,509 | Kendoff | Jan. 8, 1935 |

FOREIGN PATENTS

| Number | Country | Date |
|---|---|---|
| 22,160 | Great Britain | of 1906 |
| 484,696 | Germany | Oct. 18, 1929 |
| 758,893 | France | Jan. 24, 1934 |